(12) United States Patent
Cumby et al.

(10) Patent No.: US 11,036,942 B2
(45) Date of Patent: Jun. 15, 2021

(54) RFID TEXTILE TESTING SYSTEM AND METHOD

(71) Applicant: AVERY DENNISON RETAIL INFORMATION SERVICES LLC, Mentor, OH (US)

(72) Inventors: Brad Cumby, Liberty Township, OH (US); Joseph Bernicke, Napoleon, OH (US)

(73) Assignee: Avery Dennison Retail Information Services, LLC, Glendale, CA (US)

( * ) Notice: Subject to any disclaimer, the term of this patent is extended or adjusted under 35 U.S.C. 154(b) by 0 days.

(21) Appl. No.: 16/726,182

(22) Filed: Dec. 23, 2019

(65) Prior Publication Data

US 2020/0202081 A1 Jun. 25, 2020

Related U.S. Application Data

(60) Provisional application No. 62/783,509, filed on Dec. 21, 2018.

(51) Int. Cl.
*G06K 7/00* (2006.01)
(52) U.S. Cl.
CPC ............................... *G06K 7/0095* (2013.01)
(58) Field of Classification Search
CPC . G06K 7/0095; G06K 19/027; G06K 19/0722
See application file for complete search history.

(56) References Cited

U.S. PATENT DOCUMENTS

| | | | |
|---|---|---|---|
| 9,913,611 B2* | 3/2018 | Wiebe | A61B 5/0015 |
| 10,426,343 B2* | 10/2019 | Lin | A61B 5/0205 |
| 2006/0220868 A1 | 10/2006 | Takasawa et al. | |
| 2007/0171081 A1 | 7/2007 | Dixon et al. | |
| 2009/0146790 A1* | 6/2009 | Speich | G06K 19/07758 340/10.1 |
| 2010/0108079 A1 | 5/2010 | Blair | |
| 2012/0234921 A1 | 9/2012 | Tiedmann et al. | |

(Continued)

OTHER PUBLICATIONS

International Search Report and Written Opinion dated Apr. 15, 2020 issued in corresponding IA No. PCT/US2019/068440 filed Dec. 23, 2019.

(Continued)

*Primary Examiner* — Seung H Lee

(57) ABSTRACT

A method of stabilizing a RFID testing procedure for testing a RFID tag includes placing a RFID tag on a surface, placing a textile on the RFID tag and transmitting a first radio frequency signal to the RFID tag, and measuring a first signal from the RFID tag received in response to transmitting the first radio frequency signal to the RFID tag. The exemplary method further includes placing a first spacing object having a first spacing length between the RFID tag and the textile, the first spacing length extending from the RFID tag to the textile, transmitting a second radio frequency signal to the RFID tag, and measuring a second signal from the RFID tag received in response to transmitting the second radio frequency signal to the RFID tag. The method further includes analyzing the first signal and the second signal to determine whether the RFID tag is operational.

20 Claims, 19 Drawing Sheets

(56) References Cited

U.S. PATENT DOCUMENTS

2015/0181692 A1\* 6/2015 Jezewski ................ D03D 11/02
361/679.03
2019/0228280 A1\* 7/2019 Zanesi ...................... B32B 3/08

OTHER PUBLICATIONS

Chen X et al.: "Electro-textile glove tags for wearable RFID applications," 2017 International Symposium on Antennas and Propagation (ISAP), IEEEE, Oct. 30, 2017, pp. 1-2, retrieved on Dec. 19, 2017.

\* cited by examiner

RFID TEXTILE TESTING SYSTEM AND METHOD

CROSS REFERENCE TO RELATED APPLICATION(S)

The present application claims priority to U.S. provisional utility patent application Ser. No. 62/783,509 filed Dec. 21, 2018 which is incorporated herein by reference in its entirety.

FIELD

The present disclosure describes systems and methods for stabilizing testing of RFID tags in unstable textile environments, such as testing RFID tags for use with denim.

BACKGROUND

Radio frequency identification (RFID) labels and tags are a common tool for labeling, identifying, and tracking various goods and people. The goods so labeled involve a wide range of industries and include packages being shipped, cars, keys, livestock, identification badges, and merchandise in stores. RFID tags, either active or passive, are typically used with an RFID reader to read information from the RFID tag embedded in the label. For passive tags, a typical RFID reader/writer energizes transponder circuitry in the tag by transmitting a power signal. The power signal may convey data, which can be stored in a transponder memory, or the transponder circuitry may transmit a response signal containing data previously stored in its memory. If the transponder circuitry transmits a response signal, the RFID reader/writer receives the response signal and interprets the stored data. The data is then transmitted to a host computer for processing.

Some environments of RFID tags may present challenges for testing the effectiveness of the RFID tag in a lab environment. One such situation is when RFID tags are used with textiles that present an unstable electrical environment. Different folding techniques of a textile, such as denim, may result in a given RFID tag passing or failing a testing protocol. For example, a RFID tag used in a stack of blue jeans may respond at a first frequency when the jeans are compressed, and respond at a different frequency when uncompressed due to air within the denim affecting the permittivity of the area surrounding the RFID tag. This variability of permittivity may make replicating a real-world environment in a lab relatively difficult.

Therefore, systems and methods for stabilizing a RFID testing procedure for RFID tags used with textiles are desirable.

SUMMARY

An example method of stabilizing a radio frequency ID (RFID) testing procedure for testing a RFID tag to be used in a volatile textile environment includes placing a RFID tag on a surface. The method also includes placing a textile on the RFID tag and transmitting a first radio frequency signal to the RFID tag. The method further includes measuring a first signal from the RFID tag received in response to transmitting the first radio frequency signal to the RFID tag. The exemplary method further includes placing a first spacing object having a first spacing length between the RFID tag and the textile, the first spacing length extending from the RFID tag to the textile. The method also includes transmitting a second radio frequency signal to the RFID tag, and measuring a second signal from the RFID tag received in response to transmitting the second radio frequency signal to the RFID tag. The method further includes analyzing the first signal and the second signal to determine whether the RFID tag is operational.

Another example method of stabilizing a RFID testing procedure for testing a RFID tag to be used in a volatile textile environment includes placing a RFID tag on a surface and placing a first piece of a testing material having a first testing length on the RFID tag, the testing material simulating a textile. The method also includes transmitting a first radio frequency signal to the RFID tag and measuring a first signal from the RFID tag received in response to transmitting the first radio frequency signal to the RFID tag. The method further includes placing a second piece of the testing material having a second testing length on the RFID tag, the second testing length being different than the first testing length. The method also includes transmitting a second radio frequency signal to the RFID tag and measuring a second signal from the RFID tag received in response to transmitting the second radio frequency signal to the RFID tag. The method further includes analyzing the first signal and the second signal to determine whether the RFID tag is operational.

Another example method of stabilizing a RFID testing procedure for testing a RFID tag to be used in a volatile textile environment includes placing a RFID tag on a surface, transmitting a first radio frequency signal to the RFID tag, and measuring a first signal from the RFID tag received in response to transmitting the first radio frequency signal to the RFID tag. The method further includes placing a material on the RFID tag, transmitting a second radio frequency signal to the RFID tag, and measuring a second signal from the RFID tag received in response to transmitting the second radio frequency signal to the RFID tag. The method also includes analyzing the first signal and the second signal to determine whether the RFID tag is operational.

BRIEF DESCRIPTION OF THE FIGURES

Advantages of embodiments of the label constructions disclosed herein will be apparent from the following detailed description of the exemplary embodiments, which detailed description should be considered in conjunction with the accompanying figures.

DETAILED DESCRIPTION

Systems and methods for stabilizing a testing environment for testing a radio frequency ID (RFID) tag are disclosed herein. The systems and methods may be used to simulate a complex textile environment of the RFID tag. Alternate embodiments may be devised without departing from the spirit or the scope of composite label constructions as disclosed herein. Additionally, well-known elements of exemplary embodiments of the systems and methods will not be described in detail or will be omitted so as not to obscure the relevant details of such systems and methods. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the systems and methods for stabilizing a testing environment include the discussed feature, advantage or mode of operation. Also, while systems and methods for stabilizing a testing environment label as disclosed and illustrated may be used for RFID tags as used with textile clothing articles, it is to be understood that such systems and method may be used in conjunction with RFID tags used with different types of textile material that may not be clothing articles and that such is within the scope of this description.

Figure 1A:
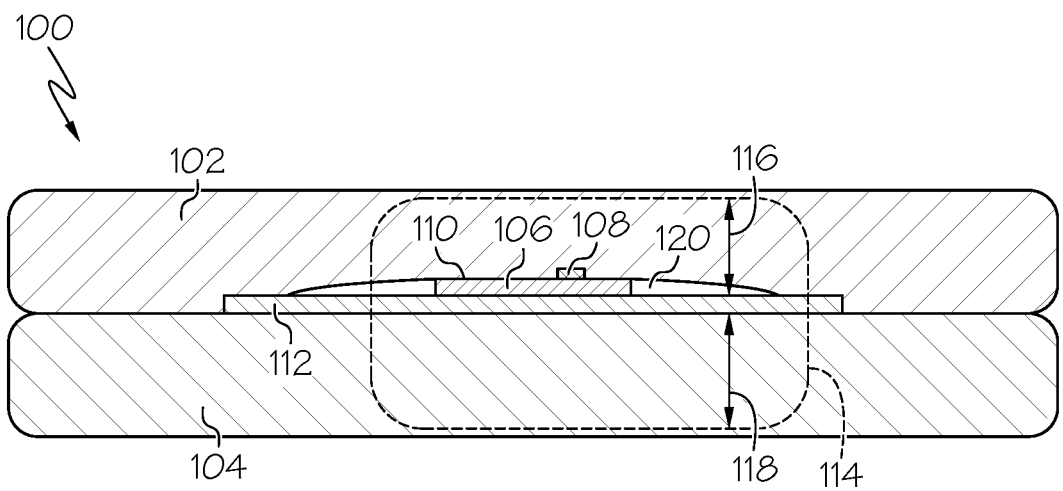
FIG. 1A and FIG. 1B illustrate an exemplary textile environment in which a RFID tag may be used as disclosed herein.
Figure 1B:
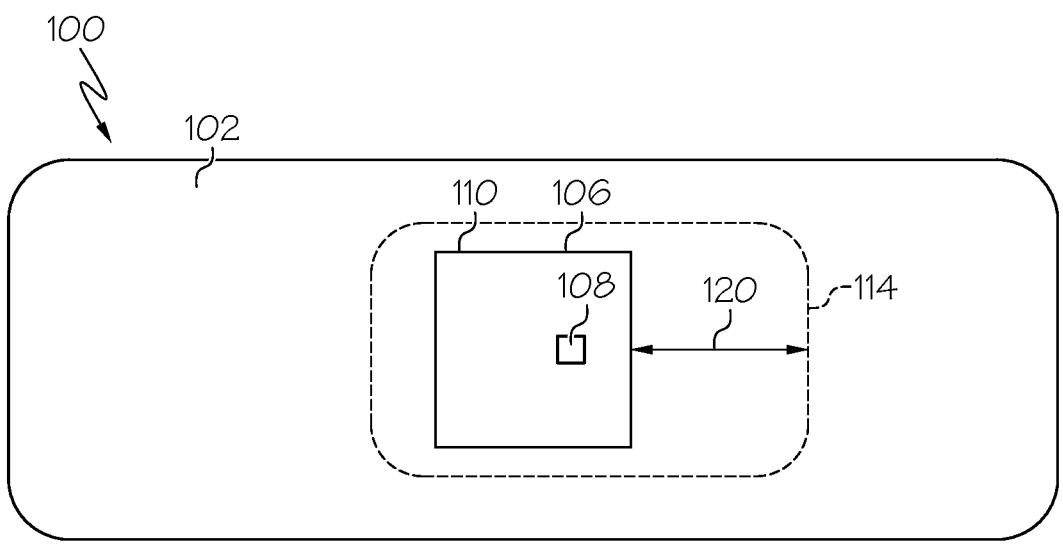

Referring to FIGS. 1A and 1B, an exemplary RFID testing system 100 is shown. The system 100 may include a textile, such as a fabric. The textile may include a first, or upper, portion 102 and a second, or lower, portion 104. The first portion 102 and the second portion 104 may be formed from the same textile item or different textile items. In an example, the first portion 102 and second portion 104 are each textiles in the form of clothing, e.g., denim pants. The system 100 may further include a RFID tag 106. The RFID tag 106 may be located between the first portion 102 and the second portion 104 of the textile. The RFID tag 106 may include a circuit 108 and an antenna 110. The antenna 110 may receive a radio frequency (RF) signal which may activate or power the circuit 108. The circuit 108 may then control the antenna 110 to transmit a response signal including information such as an identification of the RFID tag 106, information corresponding to the textile, or the like. The system 100 may further include a pocket flasher 112, which may be constructed of cardboard and/or other materials and may provide benefits such as advertisements, product information, other printed indicia, or intelligent label communication.

Some textiles may have inconsistent electrical and mechanical properties. In that regard, the physical properties of the woven fabric may result in a mixed material arrangement with each component having a distinct effect on the permittivity around the RFID tag 106. For example, this outcome may result from differing placement or folding techniques due to the unstable properties of the textile. Properties which may affect the permittivity around the RFID tag 106 may include a Young's modulus between the warped and weft direction of the textile, along with sheer and bending moment moduli. This environment of complex mechanical properties may result in relatively variable electrical properties, such as the effect of permittivity around the RFID tag 106. Because of the variable permittivity around the RFID tag 106, RF performance of the system 100 may be variable. Overall, the unreliable nature of the textile may present obstacles during design and testing of the RFID tag 106.

Components within an effective volume 114 of the RFID tag 106 may have the greatest effect on the RF performance of the tag. For example, a minor alteration in the textile within the effective volume 114 may increase or decrease the dielectric load on the antenna 110, resulting in a change in frequency response of the RFID tag 106. Wrinkles, air pockets, location of the flasher 112, asymmetrical compression, and position of the RFID tag 106 may all factor into the change in frequency. Additionally, folding techniques associated with the first and/or second portions 102 and 104 may result in an air pocket 120 within the effective volume, further affecting RF performance of the RFID tag 106.

Figure 2A:
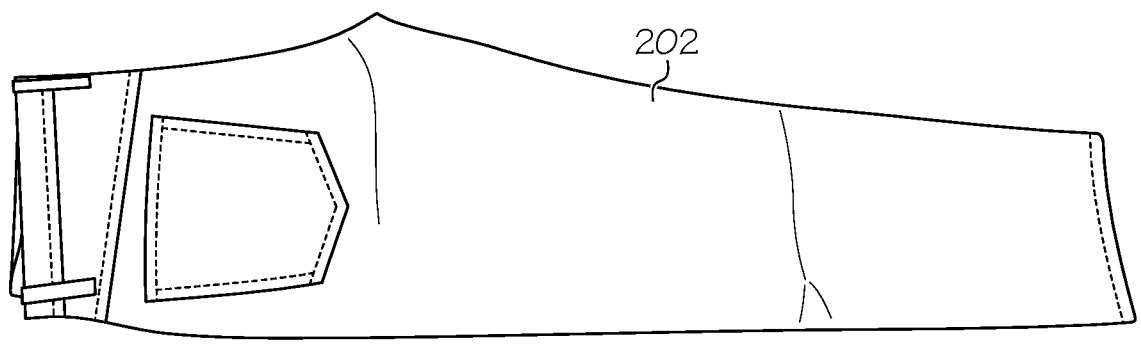
FIG. 2A, FIG. 2B, FIG. 2C, and FIG. 2D illustrate an exemplary denim folding technique as disclosed herein.
Figure 2B:
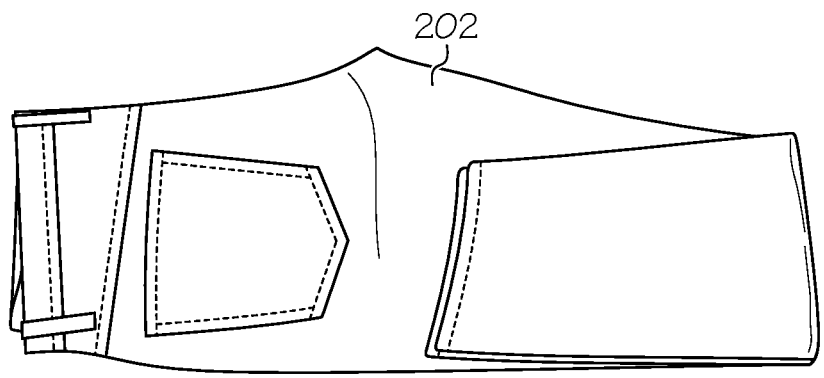
Figure 2C:
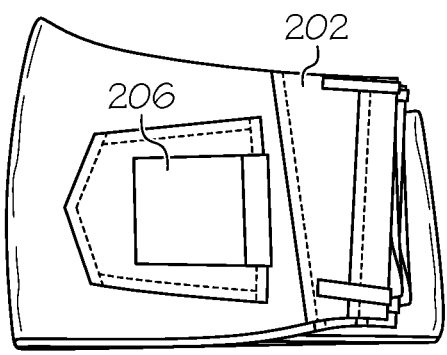
Figure 2D:
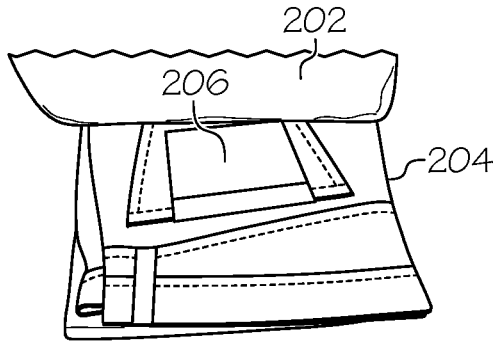

Referring now to FIGS. 2A through 2D, an exemplary test setup is shown. In FIG. 2A, a first portion 202 of a textile may be extended. In FIG. 2B, the bottom third of the first portion 202 may be folded up. In FIG. 2C, the top third of the first portion 202 may be folded down. A RFID tag 206 may be located on the top third of the first portion 202. In FIG. 2D, a second portion 204 may be stacked on the first portion 202 (or vice versa) with the RFID tag 206 located between the first portion 202 and the second portion 204.

Figure 3A:
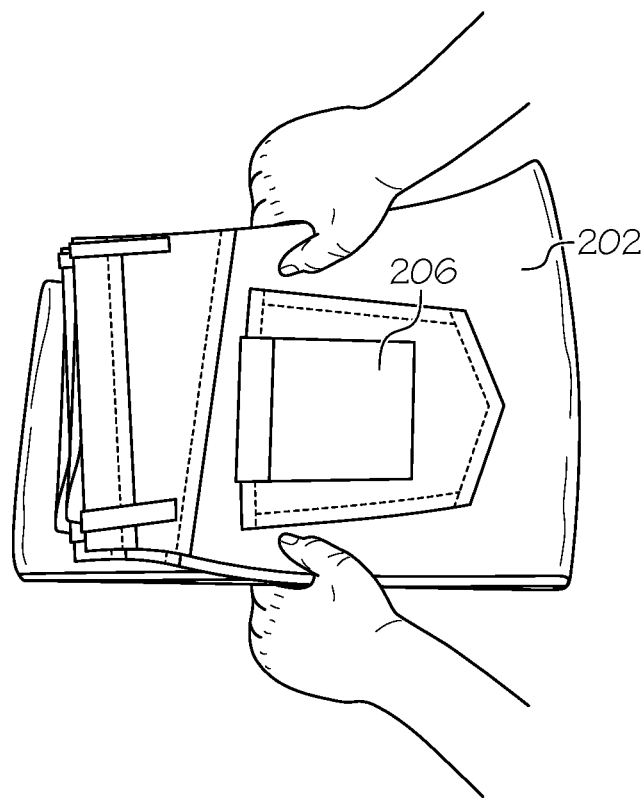
FIG. 3A and FIG. 3B illustrate exemplary folding techniques of denim that effect permittivity of the denim as disclosed herein.
Figure 3B:
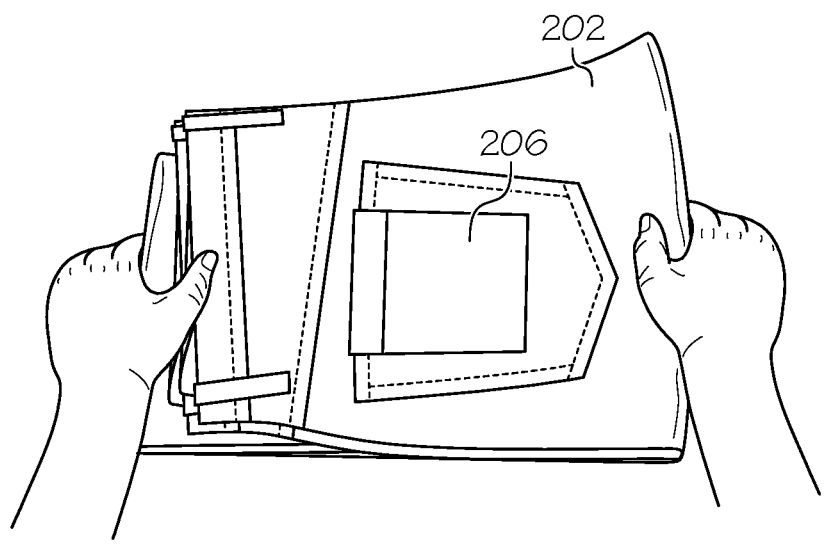

The technique used in folding the first portion 202 and the second portion 204 may significantly affect the RF performance of the RFID tag 206. For example, the first portion 202 and/or the second portion 204 may be compressed after folding, thus removing most of the air in the textile. As another example, the first portion 202 and/or the second portion 204 may be partially compressed after folding, thus removing some air from the textile. As yet another example, the first portion 202 and/or the second portion 204 may be uncompressed (i.e., in a fluffed state), thus allowing the air to remain in the textile. As yet another example and referring to FIG. 3A, the first portion 202 may be folded in a concave-up manner, reducing or eliminating an air pocket from the effective volume of the RFID tag 206. Referring to FIG. 3B, the first portion 202 may be folded in a concave-down manner, increasing a volume of an air pocket in the effective volume of the RFID 206.

Figure 4A:
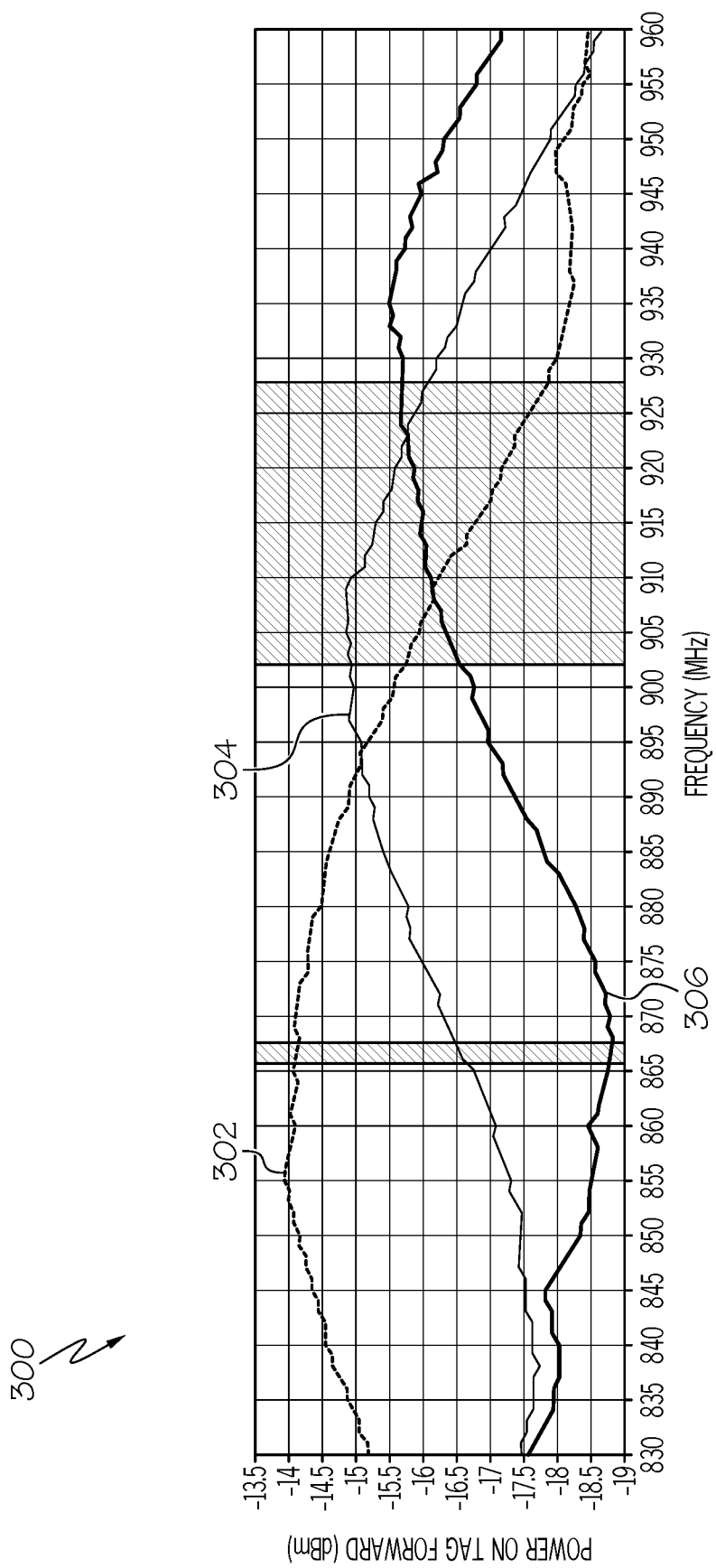
FIG. 4A, FIG. 4B, and FIG. 4C are graphs illustrating frequency response of a RFID tag in various situations illustrate as disclosed herein.
Figure 4B:
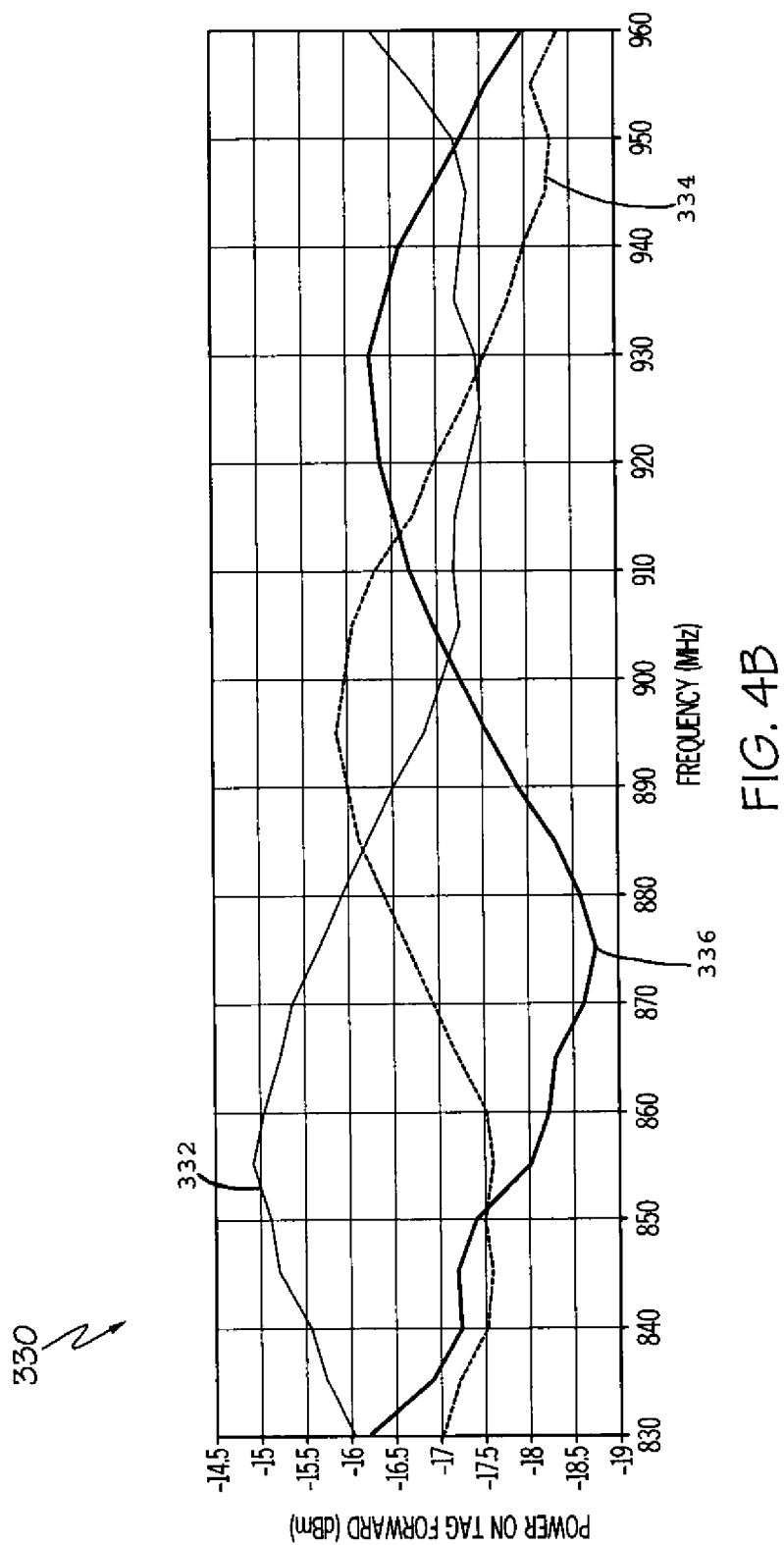
Figure 4C:
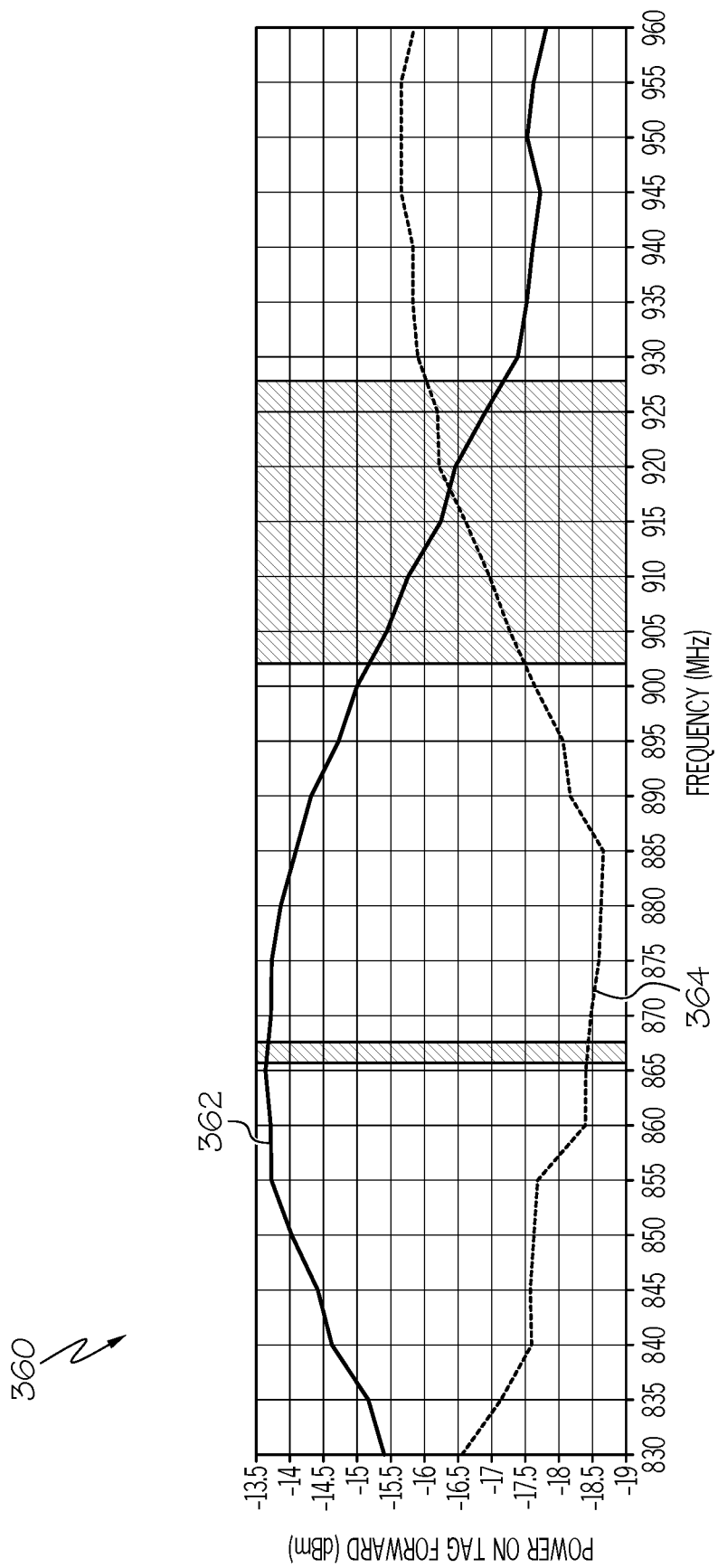

Turning now to FIGS. 4A through 4C, various graphs illustrate the effect of some of these factors in the RF performance of the RFID tag 206 of FIG. 2C. Referring to FIG. 4A, a graph 300 illustrates RF performance of a compressed state of the textile, a pressed state of the textile, and a fluffed state of the textile. The X-axis corresponds to frequency, and the Y-axis corresponds to power on the RFID tag (measured in dBm). A line 302 illustrates RF performance of the RFID tag when the textile is fully compressed. A line 304 illustrates RF performance of the RFID tag when the textile is pressed. A line 306 illustrates RF performance of the RFID tag when the textile is fluffed. Where used herein, the fully compressed state may occur when the textile is pressed to the point that its height fails to change if more pressure is added. Most or all of the air is pushed out and the textile lies directly on the RFID tag. The pressed state may occur when the textile is folded and light pressure is applied to the textile (or the textile is placed concave up). The fluffed state may occur during normal folding without any compression on the textile (or the textile is placed concave down). As shown, the RF performance of the RFID tag may be significantly affected based on the folding technique.

Referring to FIG. 4B, a graph 330 illustrates RF performance of a compressed textile, the textile folded concave up, and the textile folded concave down. The X-axis corresponds to frequency, and the Y-axis corresponds to power on the RFID tag (measured in dBm). A line 332 illustrates RF performance of the RFID tag when the textile is fully compressed. A line 334 illustrates RF performance of the RFID tag when the textile is folded concave up. A line 336 illustrates RF performance of the RFID tag when the textile is folded concave down. As shown, the RF performance of the RFID tag may be significantly affected based on the folding technique.

Referring to FIG. 4C, a graph 360 illustrates RF performance of a compressed textile and a textile with an air pocket therein. The X-axis corresponds to frequency, and the Y-axis corresponds to power on the RFID tag (measured in dBm). A line 362 illustrates RF performance of the RFID tag when the textile is fully compressed and no air pocket exists. A line 364 illustrates RF performance of the RFID tag when an air pocket exists in the textile. As shown, the air pocket may significantly affect RF performance of the RFID tag.

Figure 5:
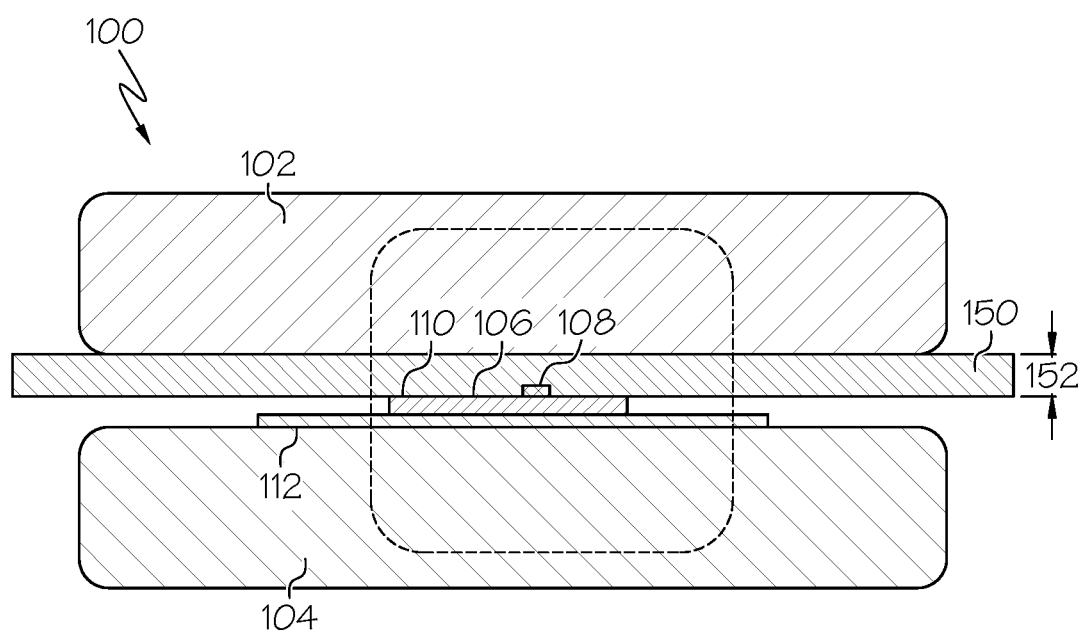
FIG. 5 illustrates a system for simulating various textile states for testing a RFID tag in a testing environment as disclosed herein.

Referring now to FIG. 5, the system 100 may be altered to replicate the results of testing the textile in the compressed state, the pressed state, and the fluffed state which are shown in FIG. 4A. A spacing object 150 may be inserted between the first portion of the textile 102 and the RFID tag 106. The spacing object 150 may include any material such as foam, wood, or the like. The spacing object 150 may simulate the air gap 120 of FIG. 1A. In that regard, the spacing object 150 may have a length 152 that extends from the RFID tag 106 to the first portion 102 of the textile.

The length 152 of the spacing object 150 may be varied to simulate the various states of the textile. In particular, the textile may be fully compressed without the spacing object 150 in order to simulate the compressed state. The textile may remain fully compressed and the spacing object 150 have a length 152 of between 0.05 inches and 0.25 inches (1.27 mm and 6.35 mm), between 0.1 inches and 0.2 inches (2.54 mm and 5.88 mm), or about 0.13 inches (3.5 mm) to simulate the pressed state. Where used in this context, about refers to the reference to value plus or minus 10 percent (10%) of the referenced value. The textile may remain fully compressed and the spacing object 150 have a length 152 of between 0.3 inches and 0.6 inches (7.62 mm and 15.24 mm), between 0.4 inches and 0.5 inches (10.16 mm and 12.7 mm), or about 0.45 inches (11.5 mm) to simulate the fluffed state. These values may correspond to a textile of denim and a spacing object 150 being formed from foam. Returning reference to FIG. 4A, experiments using the spacing object 150 provided the same results as the graph 400 using no spacing object for the compressed state, a length 152 of 0.13 inches to simulate the pressed state, and a length 152 of 0.45 inches to simulate the fluffed state. The results obtained were the same as the results using the various states of the denim.

Figure 6A:
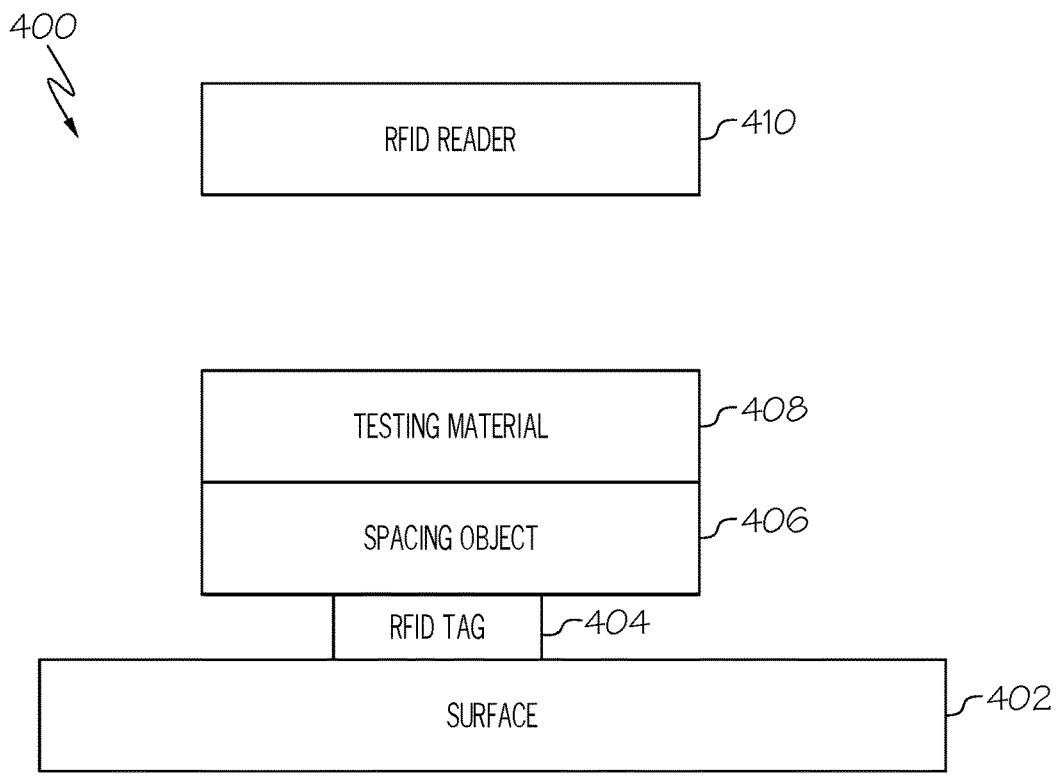
FIG. 6A and FIG. 6B illustrate systems for stabilizing testing of a RFID tag for use with textiles as disclosed herein.

Referring now to FIG. 6A, a system 400 for testing performance of a RFID tag 404 used in textiles is shown. The system 400 may be used to test performance in an environment in which the textile may affect RF performance of the RFID tag 404. The system 400 may include a surface 402 upon which the RFID tag 404 may be placed. The surface may include a textile, a test bench, or any other surface. The system 400 may further include the RFID tag 404 to be tested. A spacing object 406, such as a block of foam or wood, may be placed on the RFID tag 404 such that the RFID tag 404 is located between the spacing object 406 and the surface 402. A textile 408, such as denim, may be placed on the spacing object 406. A RFID reader 410 may transmit a signal to the RFID tag 404 which may power up the RFID tag 404. In response to receiving the signal, the RFID tag 404 may transmit a response signal to the RFID reader 410. The RFID reader 410 (or a computer or processor coupled to the RFID reader 410) may receive the response signal from the RFID tag 404 and may determine whether the RFID tag 404 is operational based on parameters of the received signal. The spacing object 406 may be removed or replaced with a spacing object having a different length to simulate the various states of the textile 408.

Figure 7A:
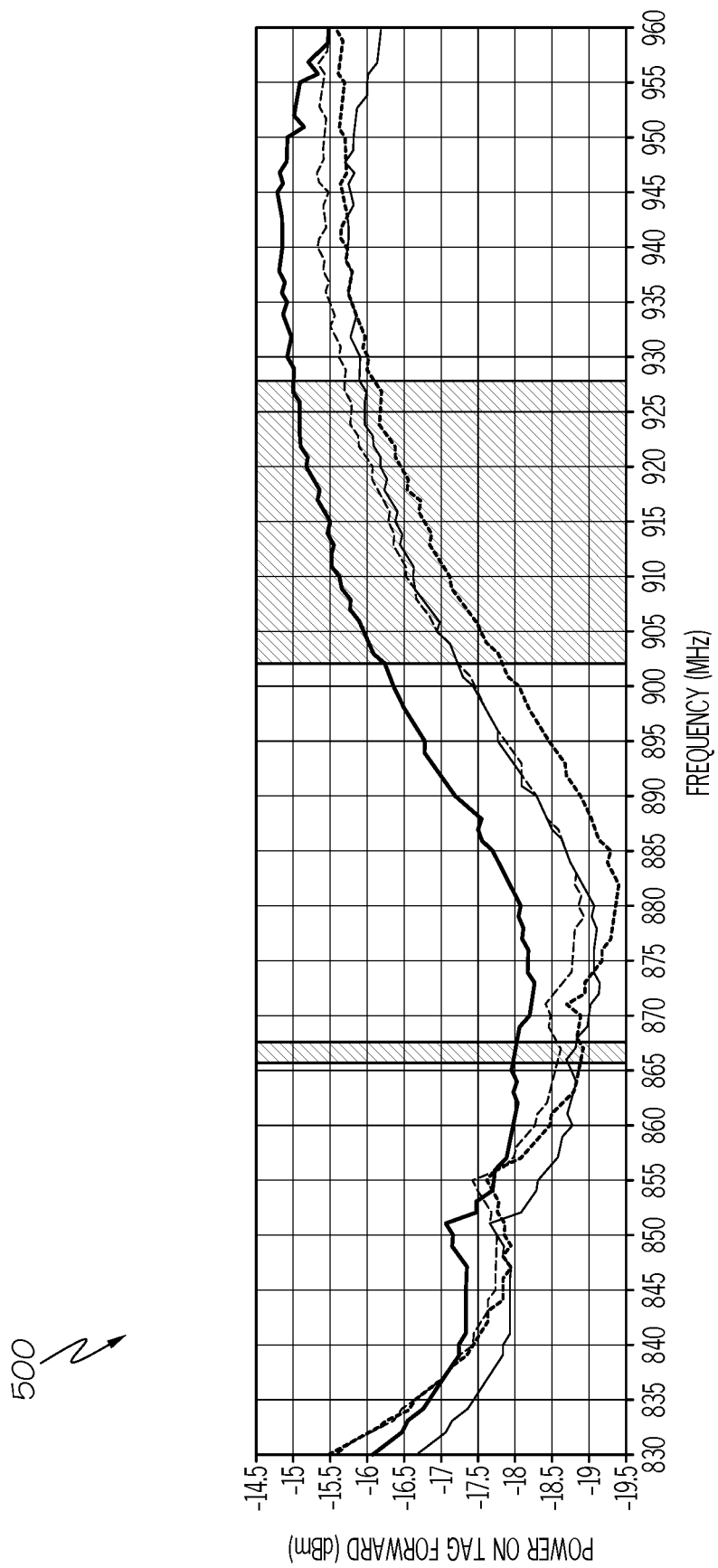
FIG. 7A and FIG. 7B illustrate results of experiments using the systems of FIGS. 6A and 6B as disclosed herein.

When increasing the length of the spacing object 406, there is a point where no change in length affects RF performance (i.e., when the textile 408 is far enough away that it doesn't interfere with the tag). However, while increasing the length of the spacing object 406 this amount, the transition between the near/far field properties reverses the general trend. FIG. 7A is a graph 500 illustrating a plot with length ranges with the resulting frequency trend, and Table 1 below illustrates the peak frequency trends.

TABLE 1

| Thickness (cm): | Peak Frequency Trend |
| --- | --- |
| 0-2.3 | Increasing |
| 2.3-12.6 | Decreasing |
| 12.6-18 | Increasing |
| >18 | Stagnant (Matches one denim) |

Figure 7B:
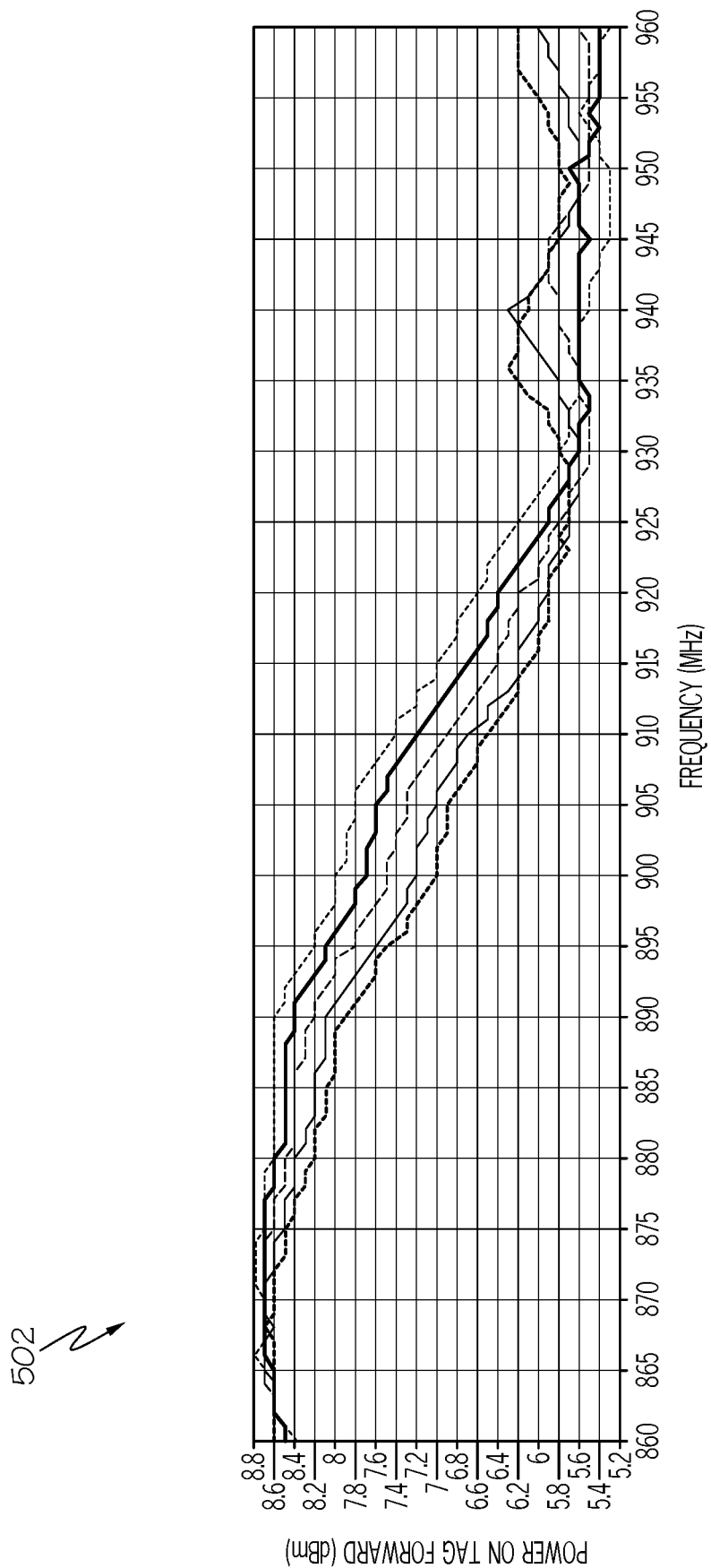

When decreasing the air passed the compressed state, the close proximity to the circuit of the RFID tag alters the impedance and how the autotune of the circuit responds. FIG. 7B is a graph 502 illustrating an example of this trend through varying the compression in very small increments.

Figure 6B:
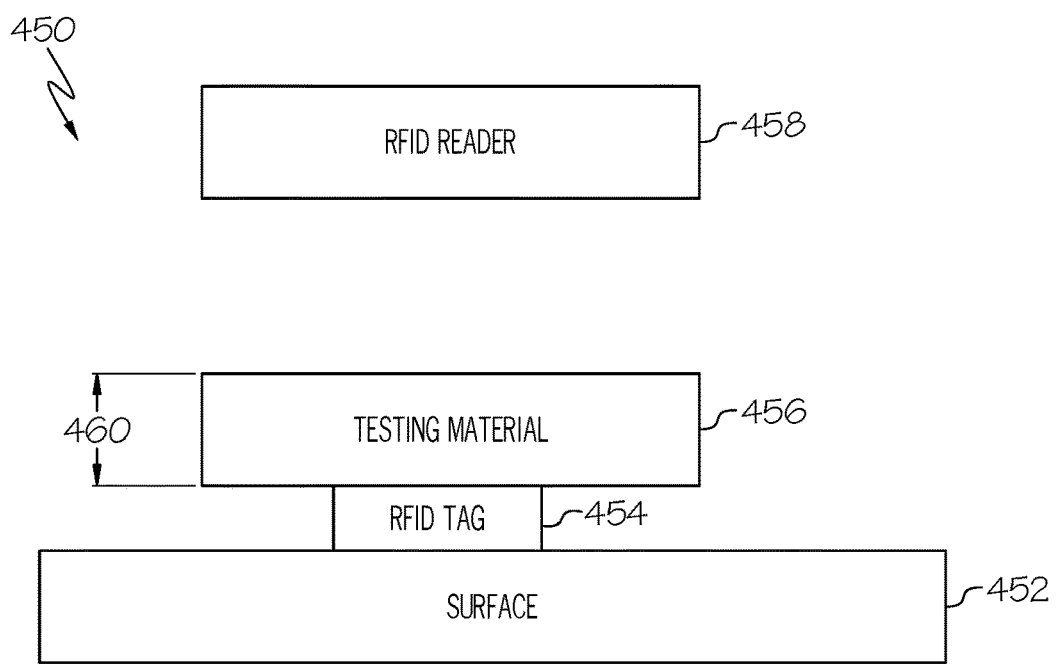

In some embodiments, it may be desirable to simulate the various states of the textile using another, more stable, material. Referring to FIG. 6B, a system 450 may be used to determine whether a RFID tag 454 is operational in a textile setting using a more stable material than the textile. The system 450 may include a surface 452 upon which the RFID tag 454 may be placed. A testing material 456 may be placed on the RFID tag 454 and may simulate the textile. The testing material 456 may have a testing length 460. Various pieces of testing material 456 having different testing lengths 460 may be placed on the RFID tag 454 to simulate the various states of the textile. A RFID reader 458 may transmit a signal to the RFID tag 454 and may receive a response signal from the RFID tag 454.

The testing material 456 may include any material that simulates the textile. For example, the testing material 456 may include any one or more of Polytetrafluoroethylene (PTFE), Poly(methyl methacrylate) (PMMA), Polyethylene terephthalate (PET), 3D printed material, or wood. For example, a first piece of PTFE having a first length 460 may be placed on the RFID tag 454 to simulate the compressed state of the textile, a second piece of PTFE having a second length 460 may be placed on the RFID tag 456 to simulate depressed state of the textile, and a third piece of PTFE having a third length 460 may be placed on the RFID tag 456 to simulate the fluffed state of the textile.

A first piece of testing material 456 (such as PTFE) may have a first length 460 of between 0.029 inches and 0.059 inches (0.05 cm and 0.15 cm), between 0.028 inches and 0.051 inches (0.07 cm and 0.13 cm), or about 0.039 inches (0.1 cm) to simulate the compressed state of the textile. A second piece of testing material 456 may have a second length 460 of between 0.16 inches and 0.24 inches (0.4 cm and 0.6 cm), between 0.18 inches and 0.22 inches (0.45 cm and 0.55 cm), or about 0.20 inches (0.5 cm) to simulate the pressed state of the textile. A third piece of testing material 456 may have a third length 460 of between 0.28 inches and 0.51 inches (0.7 cm and 1.3 cm), between 0.35 inches and 0.43 inches (0.9 cm and 1.1 cm), or about 0.39 inches (1 cm) to simulate the fluffed state of the textile. Using PTFE as the testing material 456 and using the values referenced above, the effective permittivity of the simulated textile may be 1.67, 1.78, and 1.95, respectively. These values are the same as the values obtained using the system 400 of FIG. 6A as discussed above. The system 450 may be used to simulate any effective permittivity state found in a RFID testing environment, even an environment with relatively unstable textiles.

Figure 8A:
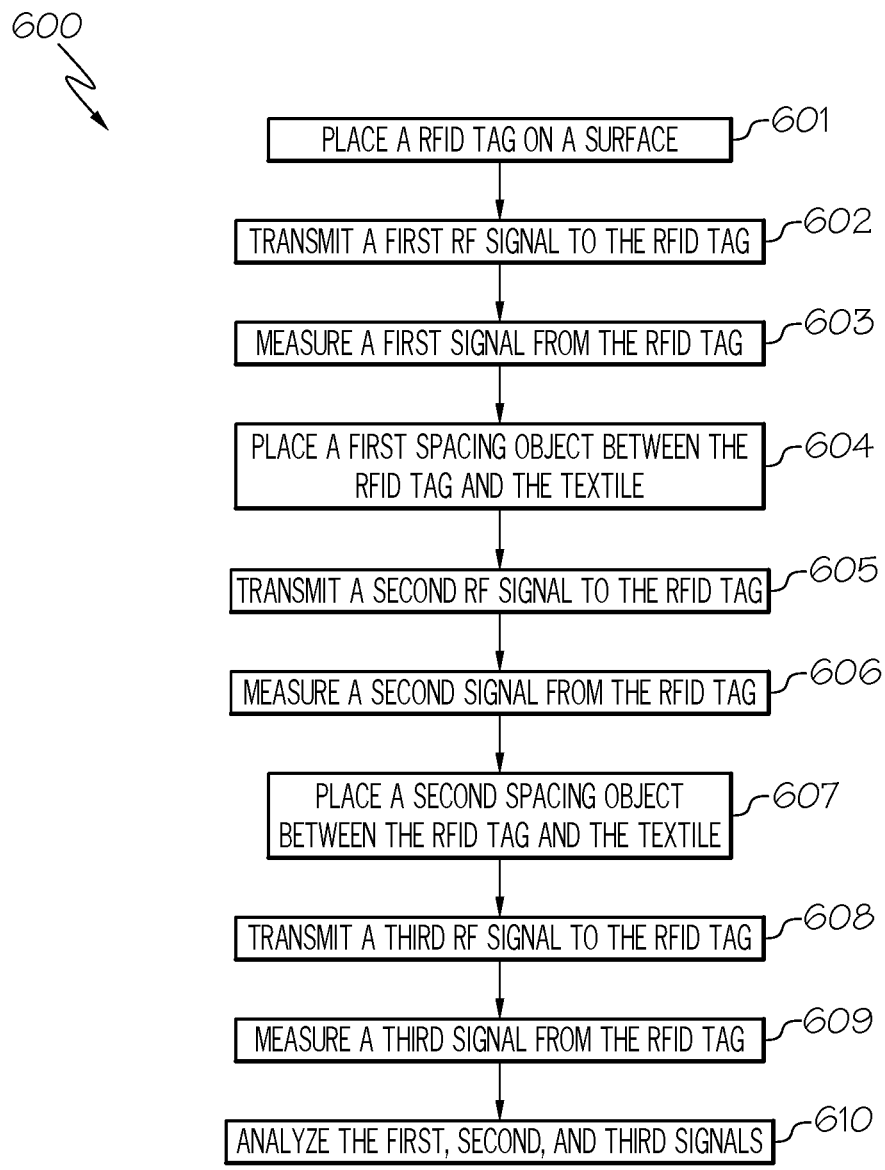
FIG. 8A and FIG. 8B illustrate methods for stabilizing testing of a RFID tag for use with textiles as disclosed herein.
Figure 8B:
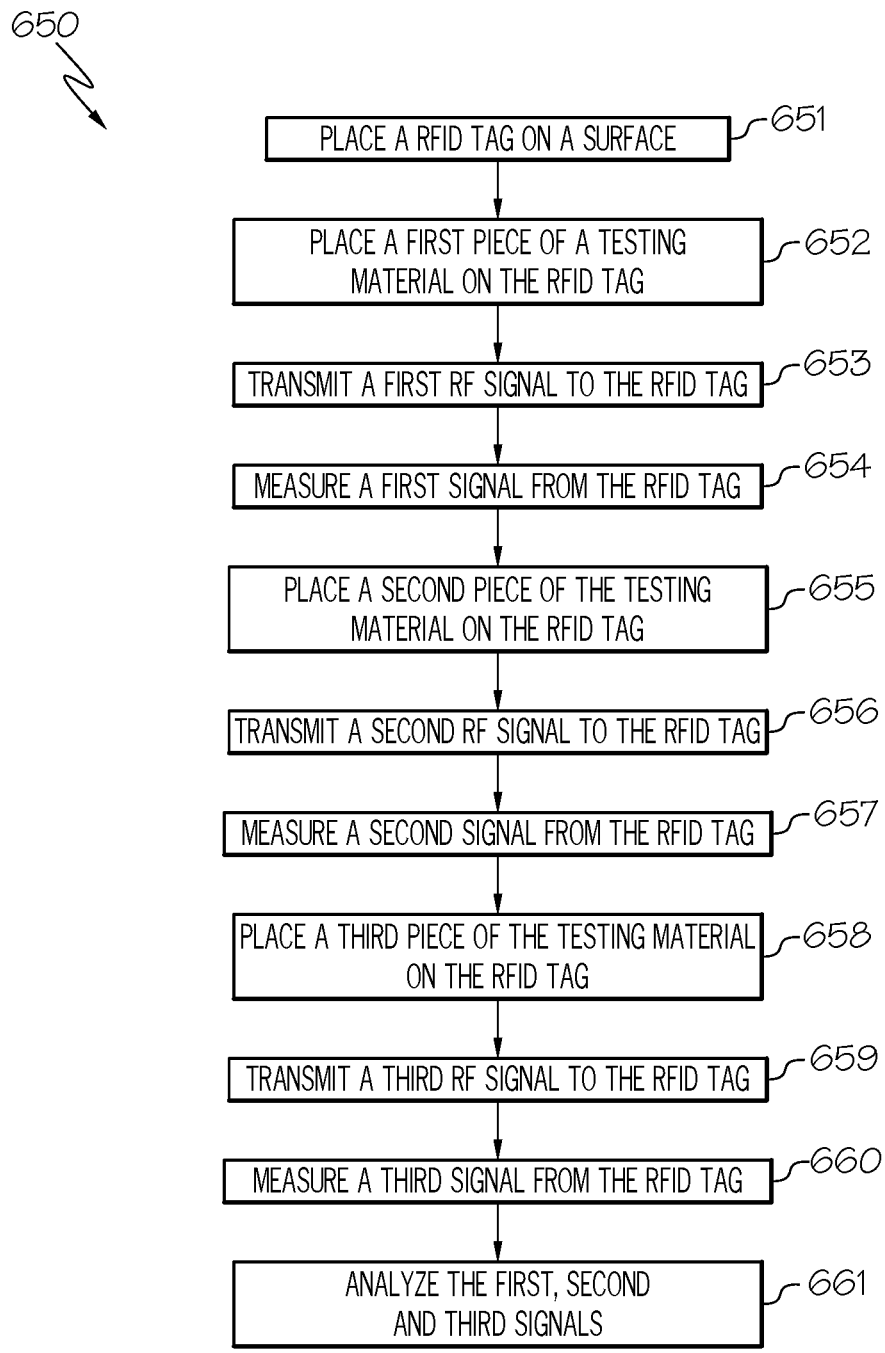

Referring now to FIGS. 8A and 8B, a method 600 may be used by a system, similar to the system 400 of FIG. 6A, to stabilize a RFID testing procedure for textiles. For example, the method 600 may be used to stabilize a RFID testing procedure for testing a RFID tag for use with denim. In block 601, a RFID tag may be placed on a surface. A compressed textile item may be placed on the RFID tag. In block 602, a first RF signal may be transmitted from a RFID reader to the RFID tag. The RFID tag may in turn respond to the RFID reader with a first signal. In block 603, the RFID reader may measure parameters of the first signal from the RFID reader, such as whether the first signal is received, frequency characteristics of the first signal, an amplitude of the first signal, or the like.

In block 604, a first spacing object having a first spacing length may be placed on the RFID tag such that the spacing object is located between the RFID tag and the textile. The first spacing object may simulate an air pocket in the textile such that the result of block 604 simulates the textile in the pressed state. The spacing object may include, for example, foam, wood, or the like. In block 605, a second RF signal may be transmitted from the RFID reader to the RFID tag. The RFID tag may respond to the second RF signal with a second signal. In block 606, parameters of the second signal from the RFID tag may be measured or calculated.

In block 607, a second spacing object having a spacing length that is greater than the first spacing length may be placed between the RFID tag and the textile. The second spacing object may simulate a second air pocket that is greater than the first air pocket. In that regard, the result of block 607 may simulate the textile in the fluffed state. In block 608, a third RF signal may be transmitted to the RFID tag. The RFID tag may respond with a third signal transmitted back to the RFID reader. In block 609, the RFID reader may measure or calculate parameters of the third signal received from the RFID tag.

In block 610, the RFID reader (or a processor or controller coupled to the RFID reader) may analyze the first, second, and third signals received from the RFID tag. Based on the analysis, the RFID reader (or processor or controller) may determine whether the RFID tag is operational, whether the RFID tag satisfies one or more design parameter of the RFID tag, or the like.

Referring now to FIGS. 8C and 8D, a method 650 may be used by a system, similar to the system 450 of FIG. 6B, to stabilize a RFID testing procedure for textiles. For example, the method 650 may be used to stabilize a RFID testing procedure for testing a RFID tag for use with denim. In block 651, a RFID tag may be placed on a surface. In block 652, a first piece of a testing material may be placed on the RFID tag. The first piece of testing material may have a first testing length that simulates a compressed state of a textile, such as denim. In block 653, a first RF signal may be transmitted from a RFID reader to the RFID tag. The RFID tag may in turn respond to the RFID reader with a first signal. In block 654, the RFID reader may measure parameters of the first signal from the RFID reader, such as whether the first signal is received, frequency characteristics of the first signal, an amplitude of the first signal, or the like.

In block 655, a second piece of the testing material may be placed on the RFID tag. The second piece of the testing material may have a second testing length that simulates a pressed state of a textile. In block 656, a second RF signal may be transmitted from the RFID reader to the RFID tag. The RFID tag may in turn respond to the RFID reader with a second signal. In block 657, the RFID reader may measure parameters of the second signal from the RFID tag.

In block 658, a third piece of the testing material may be placed on the RFID tag. The third piece of the testing material may have a third testing length that simulates a fluffed state of a textile. In block 659, the RFID reader may transmit a third RF signal to the RFID tag. The RFID tag may in turn respond to the RFID tag with a third signal. In block 660, the RFID reader may measure parameters of the third signal from the RFID tag.

In block 661, the RFID reader (or a processor or controller coupled to the RFID reader) may analyze the first, second, and third signals received from the RFID tag. Based on the analysis, the RFID reader (or processor or controller) may determine whether the RFID tag is operational, whether the RFID tag satisfies one or more design parameter of the RFID tag, or the like.

The above-referenced systems, methods, and results (i.e., using a spacing material or alternative material to simulate the various states of the textile environment) may be understood through the permittivity of the effective volume surrounding the tag in each state. Adding foam creates more air, thus decreasing the permittivity. Removing foam reduces the amount of air, thus increasing the permittivity.

Figure 9A:
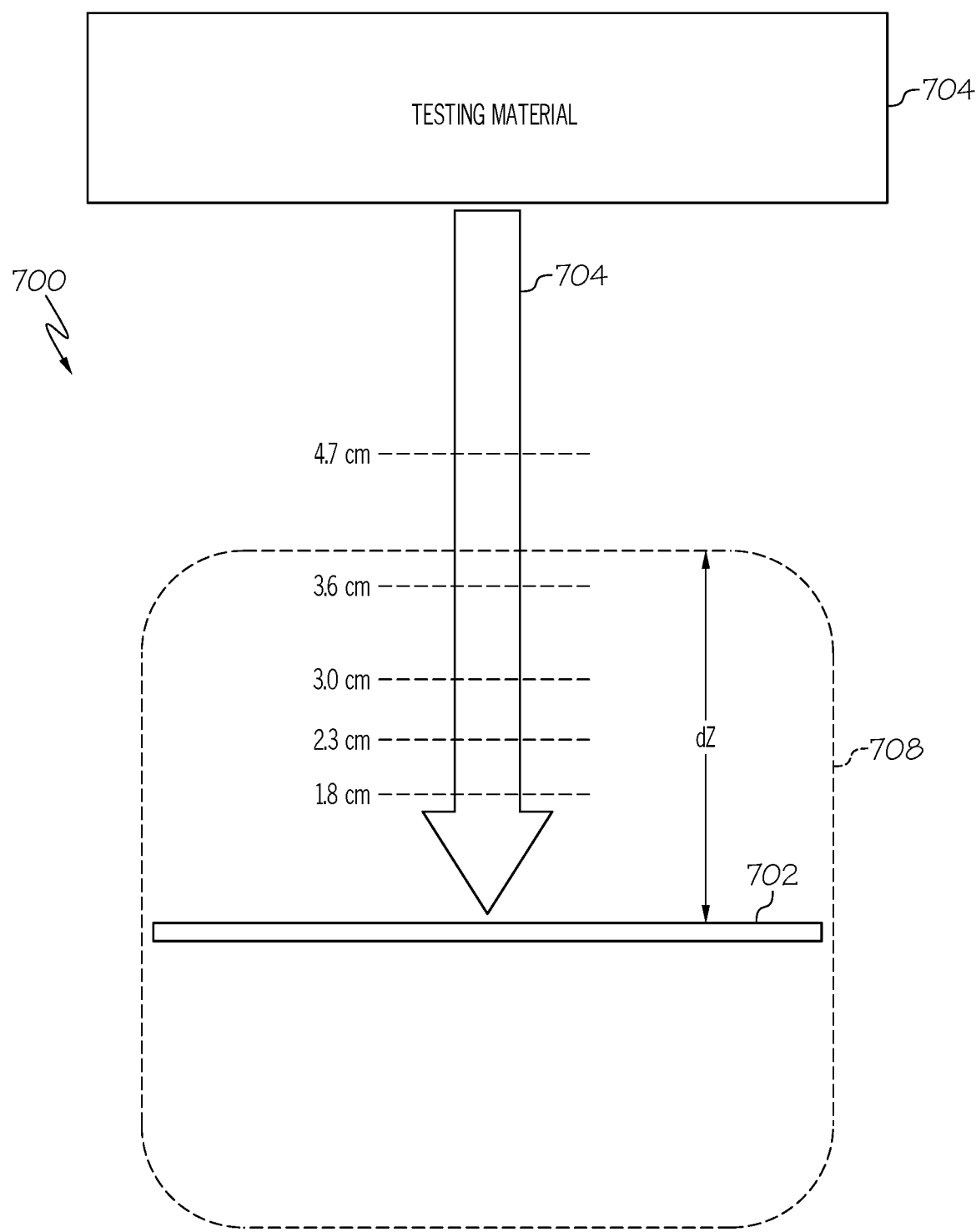
FIG. 9A and FIG. 9B illustrate a system for determining an effective volume of a textile environment and results of experimentation using the system, respectively, as disclosed herein.
Figure 9B:
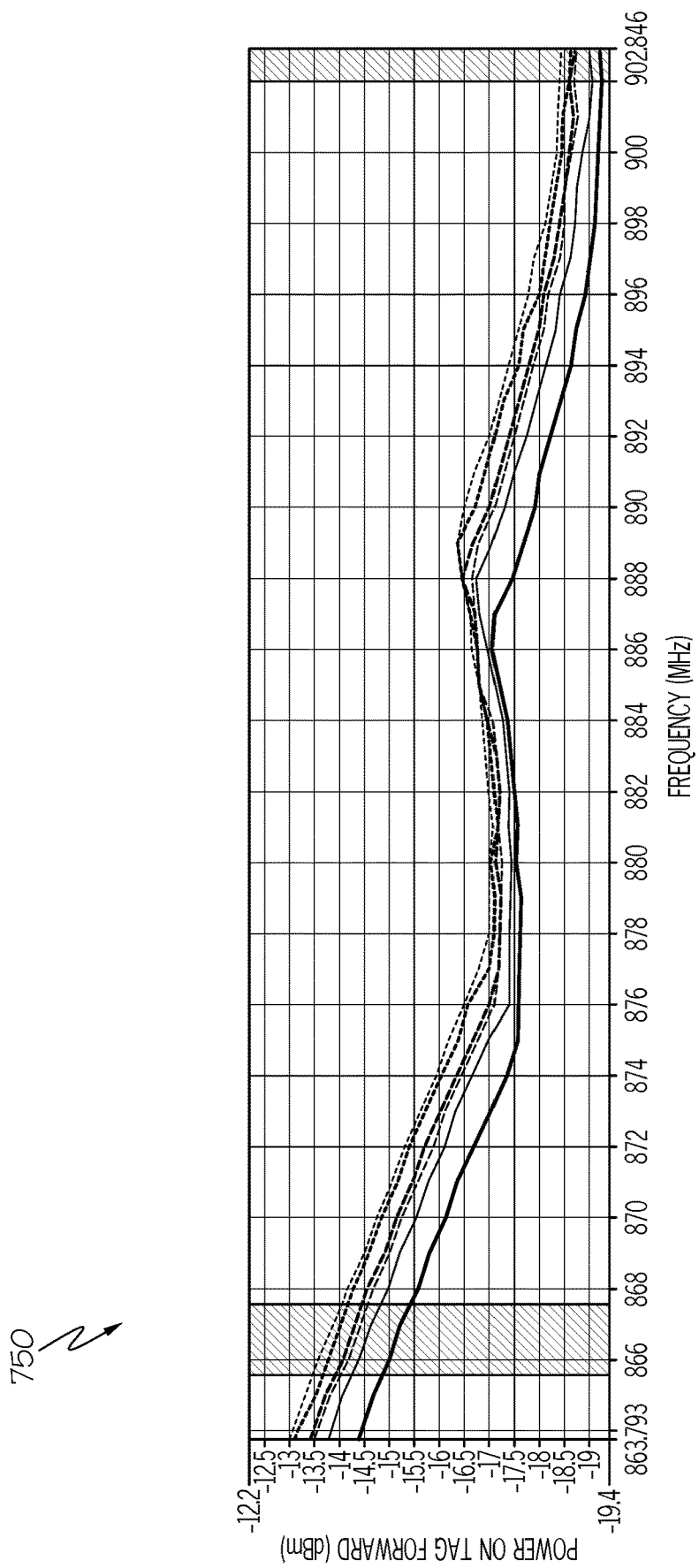

Referring now to FIG. 9A, a system 700 may be used to implement a method for determining an effective permittivity or volume of a complex environment of a RFID tag 702, such as a textile environment as described above. A testing material 706, such as PTFE, may be used to determine each dimension of the effective volume 708 of the complex environment. The RFID tag 702 may be placed above a PTFE testing place and measured for sensitivity at increasing or decreasing distances, as shown by an arrow 706. The effective length above and below the tag was found by spacing the RFID tag 702 with foam (not shown). The effective length on any side was found by placing the testing material 704 next to the specific side. Monitoring the sensitivity trend as the distance grew provided for a distance in which the effect the testing material 704 had on performance of the RFID tag 702 was lessened. Using this method, the effective volume 708 of the complex environment created by denim was found to be 3.19 cubic inches (52.3 cubic cm). Results of the experimentation using the system 700 are shown in a graph 750 of FIG. 9B.

The effective permittivity for different sample materials (including PTFE and PMMA) may be calculated. These values may be used to calculate a frequency shift, which may then be compared to the actual frequency shift observed in the test environment. The calculation may be performed using an equation similar to Equation 1 below.

$$\frac{f_{PTFE}}{f_{PMMA}} = \frac{\sqrt{\varepsilon_{PMMA}}}{\sqrt{\varepsilon_{PTFE}}} \quad \text{Equation 1}$$

Table 2 below illustrates the effective volume used from PTFE proximity tests.

TABLE 2

| Volume Used from PTFE Proximity Tests | Volume (cm³) | Dielectric Constant |
|---|---|---|
| PTFE: | 23 | 2.13 |
| Air: | 172.5 | 1 |
| Effective Volume: | 195.5 | — |
| Volumetric Fraction: | | 0.117647059 |
| Effective Permittivity: | | 1.11084765 |

Table 3 below illustrates the effective volume used from PMMA proximity tests.

TABLE 3

| Volume Used from PMMA Proximity Tests | Volume (cm³) | Dielectric Constant |
|---|---|---|
| PMMA: | 23 | 3 |
| Air: | 172.5 | 1 |
| Effective Volume: | 195.5 | — |
| Volumetric Fraction: | | 0.117647059 |
| Effective Permittivity: | | 1.185874058 |

Table 4 below illustrates the frequency calculations using the PTFE and PMMA calculations.

TABLE 4

| Freq PTFE | Freq PMMA | ε PTFE | ε PMMA | Freq ratio | ε ratio | Freq Ratio Calculated | Freq Ratio Means vs. Freq Ratio Calculated |
|---|---|---|---|---|---|---|---|
| 971 | 943 | 2.13 | 3 | 1.029692471 | 1.408450704 | 1.186781658 | 0.867634298 |
| 971 | 943 | 1.11084765 | 1.185874058 | 1.029692471 | 1.067539782 | 1.033218168 | 0.956537655 |

| | | | | | | Actual PTFE Frequency Maxima | Calculated PTFE Frequency Maxima |
|---|---|---|---|---|---|---|---|
| | | | | | | 971 | 974.324732 |

The calculated maxima match closely for the PTFE and the PMMA. However, when using the same method with a textile, such as denim, the results may be further away than for the PTFE and the PMMA. This indicates that the effective volume for the denim may be different than for the PTFE. The volume changes with electric field, which may change with the dielectric surrounding the RFID tag. The RFID tag in the denim case may have a dielectric both above and below, instead of just above for the PTFE. The total volume that matches the observed denim shift is 52.2 cm3 with a height that may be 0.94 inches (2.4 cm) instead of 3.3 inches (8.5) for the PTFE. The denim and air volumes are then optimized to be a proportion of the total volume that closely matches the response with the nominal foam thickness.

Table 5 below illustrates the calculation for effective permittivity of the system 100 of FIG. 5 using various volume proportions 152.

| 1.15 cm Foam | Volume (cm³) | Dielectric Constant |
|---|---|---|
| Denim: | 35.65 | 2.064 |
| Foam: | 19.55 | 1.235 |
| Volumetric Fraction: | | 0.645833333 |
| Effective Permittivity: | | 1.731313241 |

| 0.35 cm Foam | Volume (cm³) | Dielectric Constant |
|---|---|---|
| Denim: | 44.85 | 2.064 |
| Foam: | 10.35 | 1.235 |
| Volumetric Fraction: | | 0.8125 |
| Effective Permittivity: | | 1.876327585 |

| No Foam | Volume (cm³) | Dielectric Constant |
|---|---|---|
| Denim: | 55.2 | 2.064 |
| Foam: | 0 | 1.235 |
| Volumetric Fraction: | | 1 |
| Effective Permittivity: | | 2.064 |

Equation 2 below was used to calculate the frequency maxima of the state with 0.14 inches (3.5 mm) of foam using the measured frequency maxima of the state with 0.45 inches (11.5 mm) of foam, and the result of the calculation compared with the measured frequency maxima of the state with 0.14 inches of foam is shown in Table 6.

$$\frac{f_{3.5\ mm}}{f_{11.5\ mm}} = \frac{\sqrt{\varepsilon_{11.5\ mm}}}{\sqrt{\varepsilon_{3.5\ mm}}} \quad \text{Equation 2}$$

TABLE 6

| Measured (MHz) 11.5 mm Foam: | Resulting (MHz) 3.5 mm Foam: | Actual (MHz) 3.5 mm Foam: |
|---|---|---|
| 935 | 898.1422036 | 905 |

Equation 3 below was used to calculate the frequency maxima of the state with no foam using the measured frequency maxima of the state with 0.14 inches (3.5 mm) of foam, and the result of the calculation compared with the measured frequency maxima of the state with no foam is shown in Table 7.

$$\frac{f_{0\ mm}}{f_{3.5\ mm}} = \frac{\sqrt{\varepsilon_{3.5\ mm}}}{\sqrt{\varepsilon_{0\ mm}}} \quad \text{Equation 3}$$

TABLE 7

| Measured (MHz) 3.5 mm Foam: | Resulting (MHz) No Foam: | Actual (MHz) No Foam: |
|---|---|---|
| 905 | 862.8753539 | 865 |

Figure 10:
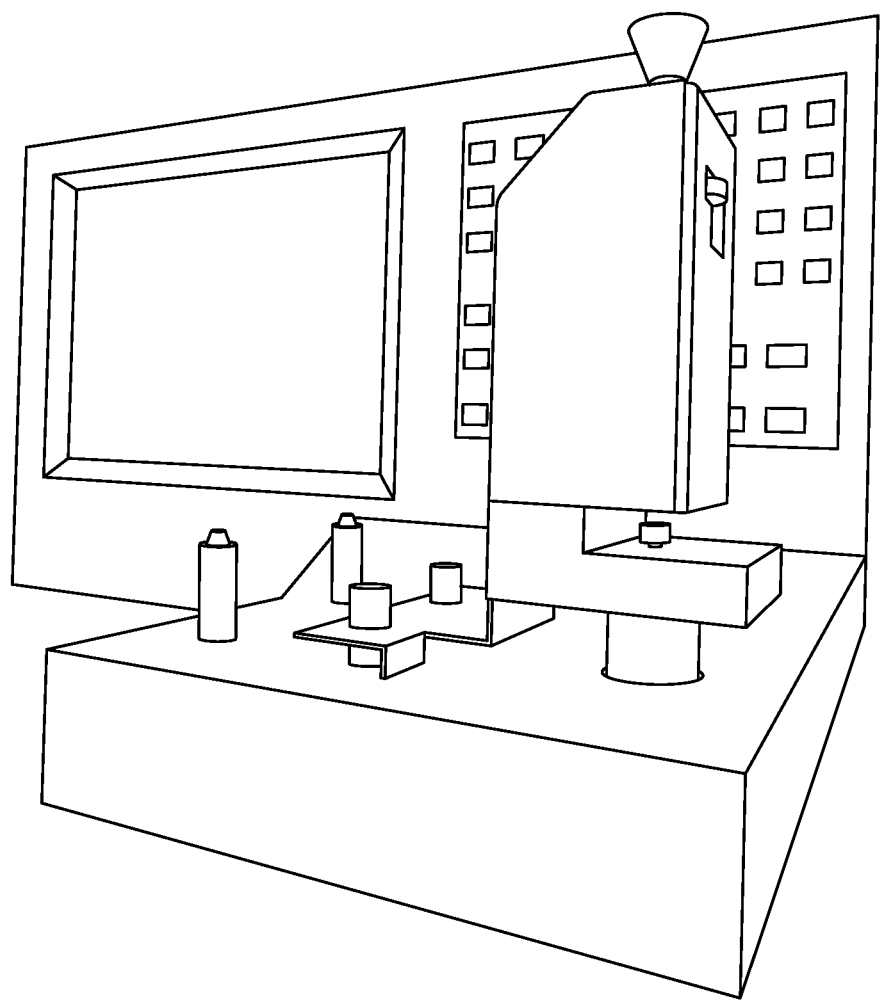
FIG. 10 illustrates a RFID tag reader as disclosed herein.
Figure 11A:
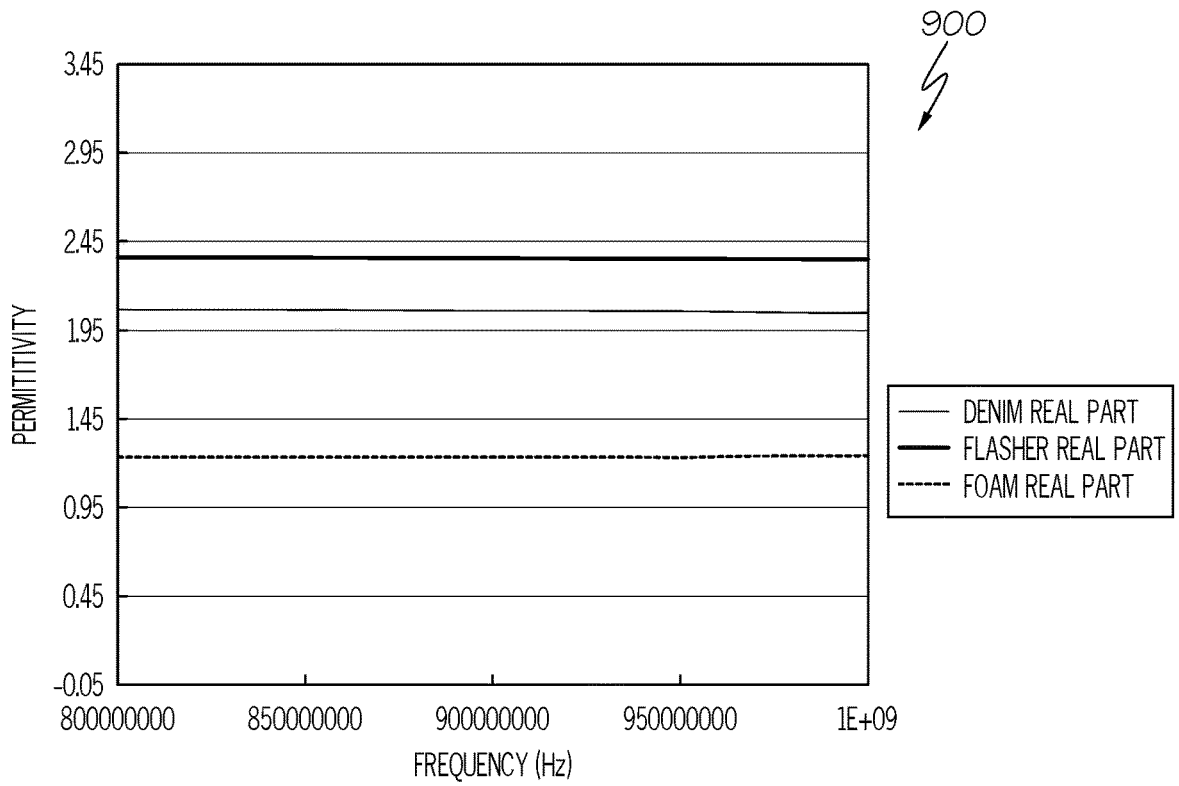
FIG. 11A and FIG. 11B illustrate real and imaginary permittivity of various components of an environment of a RFID tag for use with textiles as disclosed herein.
Figure 11B:
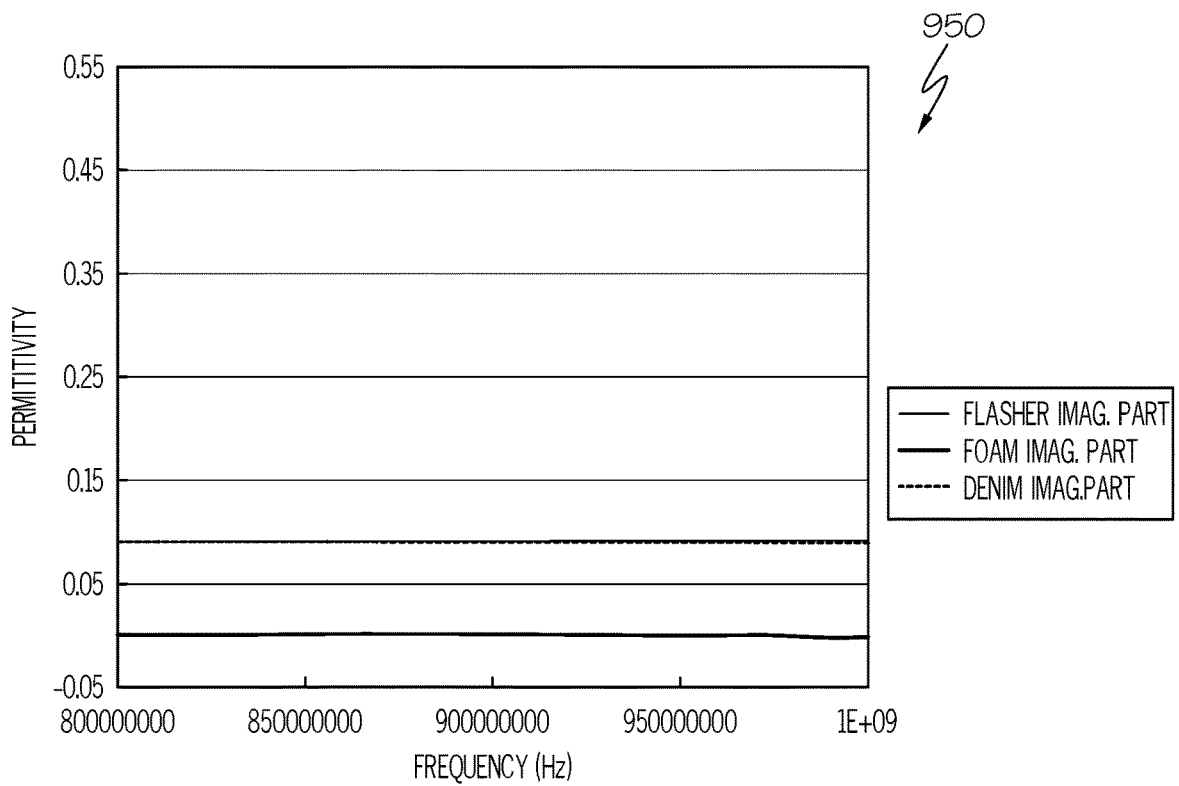

The above permittivities were measured using a material analyzer, such as the material analyzer 800 shown in FIG. 10. The results of the testing are shown below in Table 8. The real and imaginary permittivities of the various components are shown in graphs 900, 902 of FIGS. 11A and 11B, respectively.

TABLE 8

| | Permittivity | | |
|---|---|---|---|
| | Real | Imaginary | Loss Tangent |
| Denim | 2.064 | 0.0905 | 0.0438 |
| Flasher | 2.355 | 0.0905 | 0.0384 |
| Foam | 1.235 | 0.0018 | 0.0015 |

When the dielectric effect of each component can be accounted for, substitutions of different materials may be made as long as the new material matches similar permittivity and volumetric constraints. In that regard, use of alternative materials (in place of textiles) may provide sufficient test results. Using a more rigid material than a given textile may eliminate differing complex volumes and shapes around a RFID tag, which may be encountered using different folding procedures.

Figure 12A:
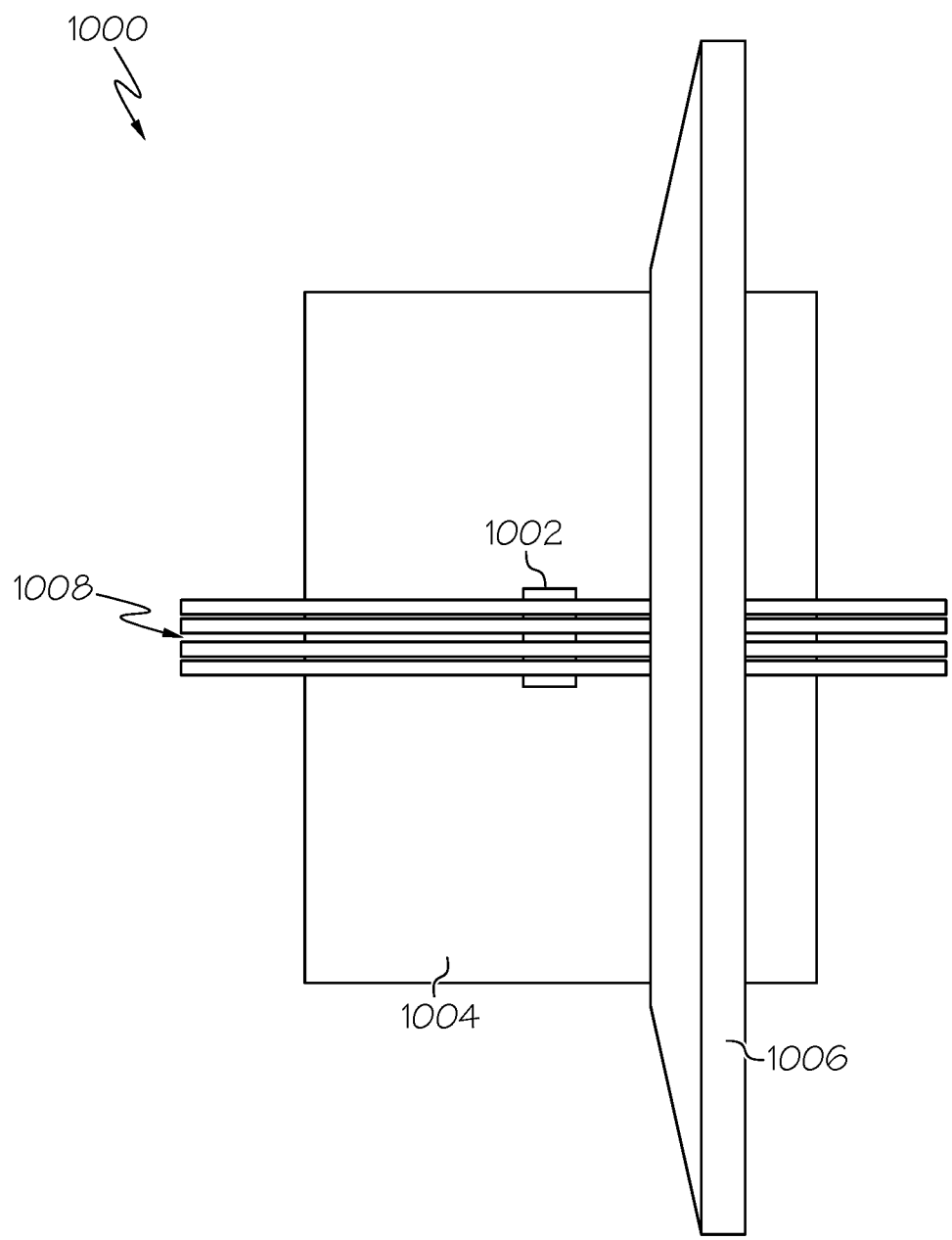
FIG. 12A, FIG. 12B, and FIG. 12C illustrate an exemplary system for simulating a textile environment of a RFID tag using wood, results of the experimentation, and permittivity of the wood relative to humidity as disclosed herein.
Figure 12B:
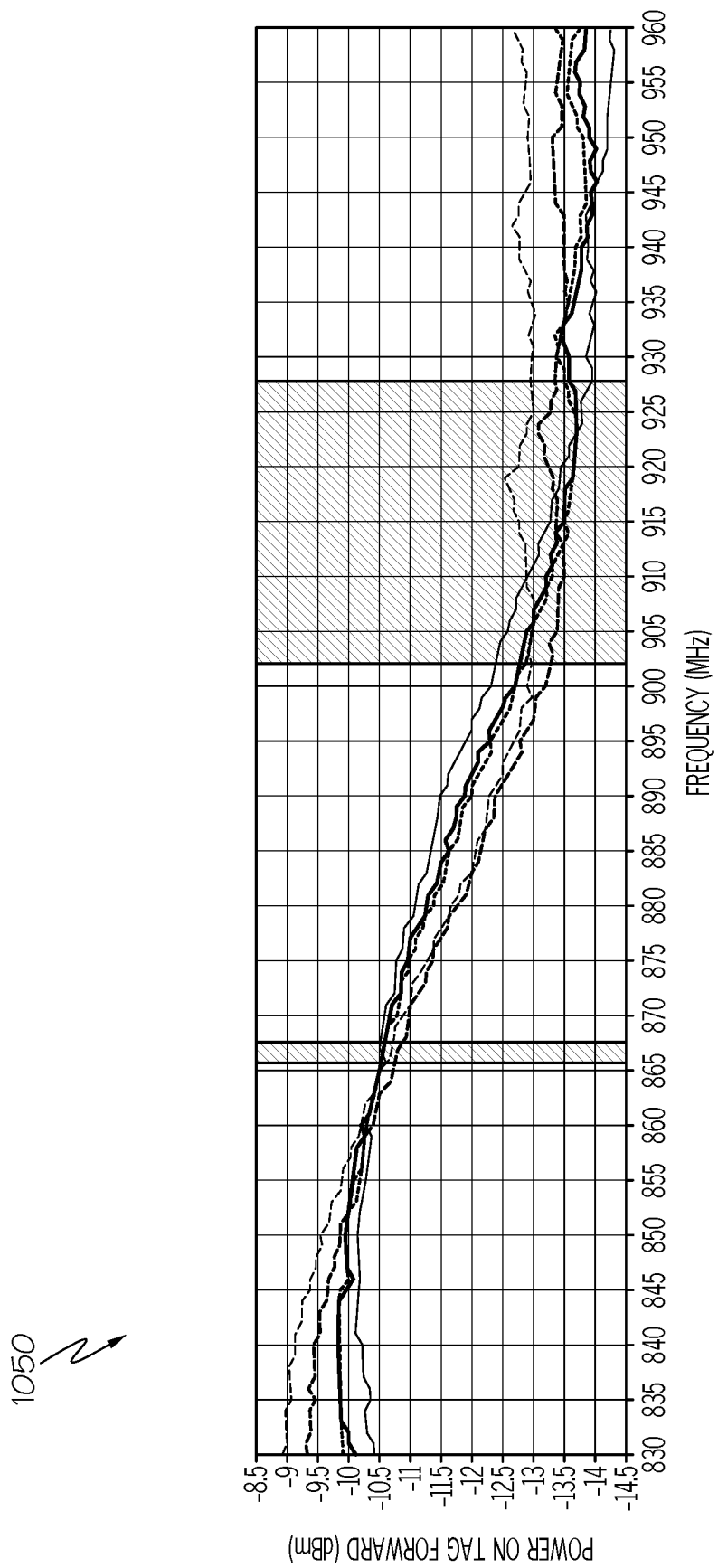

FIG. 12A illustrates a system 1000 for simulating a testing environment of a RFID tag 1002 using wood as an alternative material. Pine boards 1004, 1006 and poplar dowels 1008 are used to match a compressed state of a textile environment within 0.2 dBm. FIG. 12B is a graph 1050 illustrating results of experimentation using the system 1000 of FIG. 12A.

The trends of the graph 1050 are due to proximity, amount of material in the effective volume, and the arrangement of wood and air relative to the RFID tag 1002. These factors change the impedance and frequency of the RFID tag 1002, which is seen with a differing bandwidth and frequency maxima in the graph 1050. Wood was chosen due to being readily available. However, a concern with wood is its absorption of moisture which affects its dielectric properties.

Figure 12C:
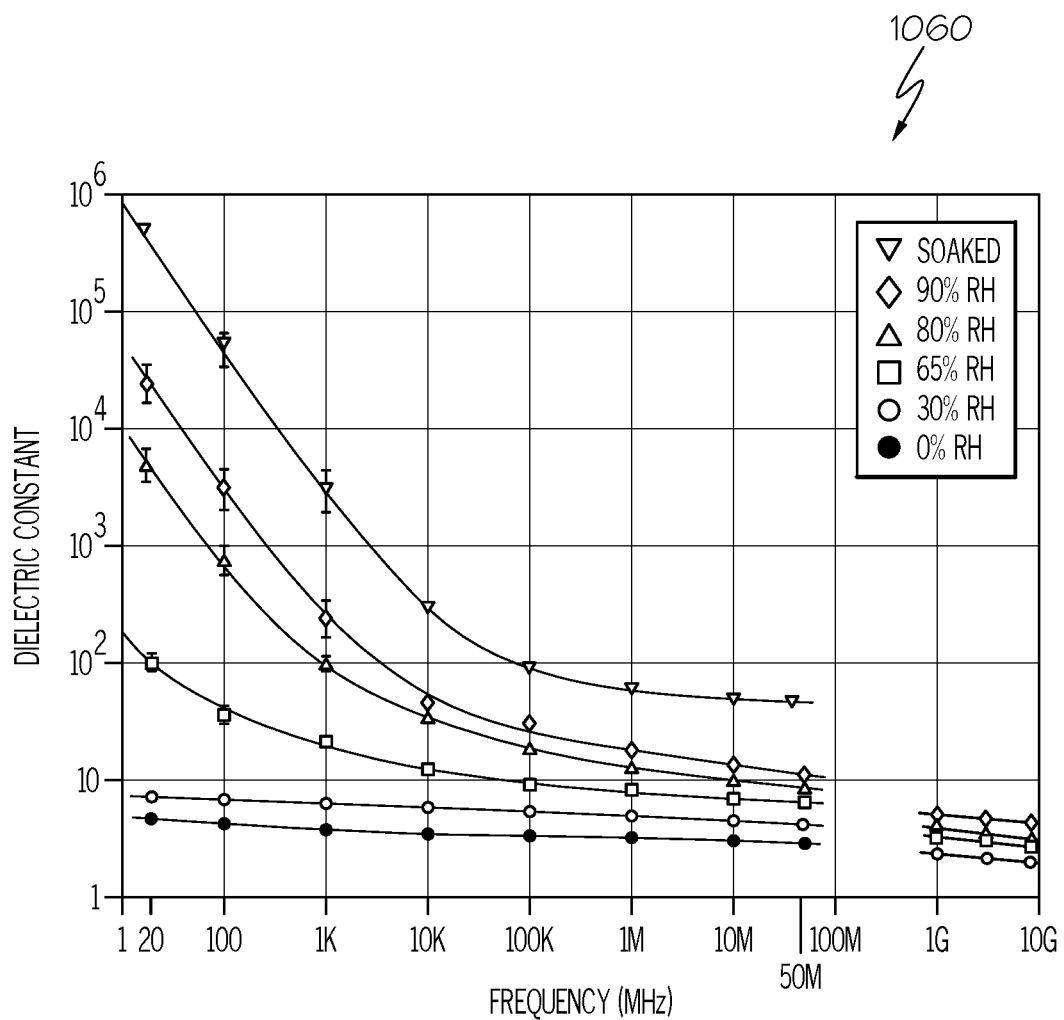

FIG. 12C is a graph 1060 illustrating permittivity versus relative humidity in Douglas Fir. The values at relatively low humidity are relatively close to that of denim. However, any difference may be compensated for by changing the ratio between permittivity and arrangement of the wood. If the effective permittivity of the material matches that of the denim setup, the sensitivity may also be matched. Plastics may provide an ideal substitute material, as its properties remain relatively constant with different ambient humidity.

The foregoing description and accompanying figures illustrate the principles, preferred embodiments and modes of operation of the systems and methods for stabilizing a testing environment as disclosed herein. However, such systems and methods should not be construed as being limited to the particular embodiments discussed above. Additional variations of the embodiments discussed above will be appreciated by those skilled in the art. Therefore, the above-described embodiments should be regarded as illustrative rather than restrictive.

Accordingly, it should be appreciated that variations to those embodiments can be made by those skilled in the art without departing from the scope of the systems and methods for stabilizing a testing environment as defined by the following claims.

What is claimed is:

1. A method of stabilizing a radio frequency ID (RFID) testing procedure for textiles, comprising the steps of:
   placing a RFID tag on a surface;
   placing a textile on the RFID tag;
   transmitting a first radio frequency signal to the RFID tag;
   measuring a first signal from the RFID tag received in response to transmitting the first radio frequency signal to the RFID tag;
   placing a first spacing object having a first spacing length between the RFID tag and the textile, the first spacing length extending from the RFID tag to the textile;
   transmitting a second radio frequency signal to the RFID tag;
   measuring a second signal from the RFID tag received in response to transmitting the second radio frequency signal to the RFID tag; and
   analyzing the first signal and the second signal to determine whether the RFID tag is operational.

2. The method as recited in claim 1 further comprising:
   placing a second spacing object having a second spacing length between the RFID tag and the textile, the second spacing length extending from the RFID tag to the textile and being different than the first spacing length;
   transmitting a third radio frequency signal to the RFID tag;
   measuring a third signal from the RFID tag received in response to transmitting the third radio frequency signal to the RFID tag; and
   analyzing the third signal to determine whether the RFID tag is operational.

3. The method as recited in claim 2 wherein the first signal corresponds to a fully compressed state of the textile, the second signal corresponds to a pressed state of the textile, the third signal corresponds to a fluffed state of the textile, and the third spacing length is greater than the second spacing length.

4. The method as recited in claim 3 wherein the first spacing length is between about 0.1 and 0.2 inches, and the second spacing length is between about 0.4 inches and 0.5 inches.

5. The method as recited in claim 1 wherein the first spacing object includes a foam.

6. The method as recited in claim 1 wherein the textile comprises denim and is fully compressed during the method.

7. The method as recited in claim 1 wherein the textile has inconsistent electrical properties, and the method further includes simulating the textile using a testing material having electrical properties that are more stable than the inconsistent electrical properties of the textile.

8. A method of stabilizing a radio frequency ID (RFID) testing procedure for textiles, comprising the steps of:
placing a RFID tag on a surface;
placing a first piece of a testing material having a first testing length on the RFID tag, the testing material simulating a textile;
transmitting a first radio frequency signal to the RFID tag;
measuring a first signal from the RFID tag received in response to transmitting the first radio frequency signal to the RFID tag;
placing a second piece of the testing material having a second testing length on the RFID tag, the second testing length being different than the first testing length;
transmitting a second radio frequency signal to the RFID tag;
measuring a second signal from the RFID tag received in response to transmitting the second radio frequency signal to the RFID tag; and
analyzing the first signal and the second signal to determine whether the RFID tag is operational.

9. The method as recited in claim 8 wherein the testing material includes at least one of Polytetrafluoroethylene (PTFE), Poly(methyl methacrylate) (PMMA), Polyethylene terephthalate (PET), 3D printed material, or wood.

10. The method as recited in claim 8 further comprising:
placing a third piece of the testing material having a third testing length on the RFID tag, the third testing length being different than the first testing length and the second testing length;
transmitting a third radio frequency signal to the RFID tag;
measuring a third signal from the RFID tag received in response to transmitting the third radio frequency signal to the RFID tag; and
analyzing the third signal to determine whether the RFID tag is operational.

11. The method as recited in claim 10 wherein the first signal corresponds to a fully compressed state of the textile, the second signal corresponds to a pressed state of the textile, and the third signal corresponds to a fluffed state of the textile.

12. The method as recited in claim 10 wherein the first testing length is between about 0.35 and 0.45 inches, the second testing length is between about 0.15 and 0.25 inches, and the third testing length is between about 0.01 and 0.1 inches.

13. The method as recited in claim 8 wherein:
the textile has inconsistent electrical properties; and
the testing material, the first length, and the second length are selected to match electrical properties of the textile in various states.

14. The method as recited in claim 13 wherein the textile comprises denim.

15. A method of stabilizing a radio frequency ID (RFID) testing procedure for textiles, comprising the steps of:
placing a RFID tag on a surface;
transmitting a first radio frequency signal to the RFID tag;
measuring a first signal from the RFID tag received in response to transmitting the first radio frequency signal to the RFID tag;
placing a material on the RFID tag;
transmitting a second radio frequency signal to the RFID tag;
measuring a second signal from the RFID tag received in response to transmitting the second radio frequency signal to the RFID tag; and
analyzing the first signal and the second signal to determine whether the RFID tag is operational.

16. The method as recited in claim 15 wherein the material includes at least one of a textile having inconsistent electrical properties or a testing material that simulates the textile.

17. The method as recited in claim 16 wherein the material includes the testing material, and the testing material is selected from the group consisting of Polytetrafluoroethylene (PTFE), Poly(methyl methacrylate) (PMMA), Polyethylene terephthalate (PET), mixture of polymers or 3D printed materials and air, wood, and combinations thereof.

18. The method as recited in claim 15 further comprising:
placing a textile having inconsistent electrical properties on the RFID tag before measuring the first signal; and
placing the textile on the material such that the material is located between the textile and the RFID tag before measuring the second signal.

19. The method as recited in claim 18 wherein the material includes a foam.

20. The method as recited in claim 18 wherein the textile comprises denim and is fully compressed during the method.

* * * * *